(12) United States Patent
Sato

(10) Patent No.: US 7,173,913 B2
(45) Date of Patent: Feb. 6, 2007

(54) NODE DEVICE FOR RING SYSTEM, AND SYSTEM AND METHOD FOR CONSTRUCTING MULTIPLE SPANNING TREES BY USING THE SAME NODE DEVICE

(75) Inventor: Yasuo Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 1040 days.

(21) Appl. No.: 10/151,252

(22) Filed: May 21, 2002

(65) Prior Publication Data

US 2002/0176373 A1 Nov. 28, 2002

(30) Foreign Application Priority Data

May 23, 2001 (JP) .............................. 2001-153280

(51) Int. Cl.
  *H04L 12/28* (2006.01)
(52) U.S. Cl. ...................................... 370/256; 370/258
(58) Field of Classification Search ..................... None
  See application file for complete search history.

(56) References Cited

U.S. PATENT DOCUMENTS 6,304,575 B1   10/2001  Carroll et al.
6,801,506 B1 *  10/2004  Dey ........................... 370/256

FOREIGN PATENT DOCUMENTS

EP    0 557 019 A2    2/1993
JP    11-275129       10/1999

* cited by examiner

*Primary Examiner*—Chi Pham
*Assistant Examiner*—Ronald Abelson
(74) *Attorney, Agent, or Firm*—McGinn IP Law Group, PLLC

(57) ABSTRACT

An object of the present invention is to provide a multiple spanning tree system in which a plurality of spanning trees are constructed in a ring system to effectively use a band of the ring system. A plurality of bridge protocol processing sections are provided in a node device to enable a plurality of bridge protocol processings to be performed in a transmission path connected to one node device. Thereby, a plurality of spanning trees can be constructed and a root bridge can be placed every each node device.

20 Claims, 12 Drawing Sheets

FIG. 4

| C\A | 1 | 2 | 3 | 4 | 5 |
|---|---|---|---|---|---|
| 1 | R | R + 4 | R + 3 | R + 2 | R + 1 |
| 2 | R + 1 | R | R + 4 | R + 3 | R + 2 |
| 3 | R + 2 | R + 1 | R | R + 4 | R + 3 |
| 4 | R + 3 | R + 2 | R + 1 | R | R + 4 |
| 5 | R + 4 | R + 3 | R + 2 | R + 1 | R |

FIG. 9

| C \ A | 1 | 2 | 3 | 4 | 5 | 6 |
|---|---|---|---|---|---|---|
| 1 | 1 | 6 | 5 | 4 | 3 | 2 |
| 2 | 2 | 1 | 6 | 5 | 4 | 3 |
| 3 | 3 | 2 | 1 | 6 | 5 | 4 |
| 4 | 4 | 3 | 2 | 1 | 6 | 5 |
| 5 | 5 | 4 | 3 | 2 | 1 | 6 |
| 6 | 6 | 5 | 4 | 3 | 2 | 1 |
|   | 20-1 | 20-2 | 20-3 | 20-4 | 20-5 | 20-6 |

NODE DEVICE FOR RING SYSTEM, AND SYSTEM AND METHOD FOR CONSTRUCTING MULTIPLE SPANNING TREES BY USING THE SAME NODE DEVICE

BACKGROUND OF THE INVENTION

1. Field of the Invention

The present invention relates to a node device for a ring system and a system and method for constructing multiple spanning trees by using the node device and, more particularly, to a method of constructing multiple spanning trees in such a manner that a transmission path in the form of a ring connecting a plurality of node devices is divided into multiple spanning trees, which are a plurality of logic topologies.

2. Description of the Prior Art

A spanning tree has been used to construct local area networks (LAN). Details of the spanning tree are specified in IEEE802.1D. In a case where a plurality of LANs are interconnected by abridge, if a loop is formed when a broadcast packet is send to the LANs, a phenomenon occurs in which passing of the broadcast packet through the loop is endlessly continued and the broadcast packet does not disappear. For the purpose of preventing such a phenomenon, a point in the communication path connected in loop form is logically disconnected by processing under a protocol called a spanning tree protocol (bridge protocol) to form a tree structure.

With the recent development of data centers, increase of use of Gigabit Ethernet, etc., a need has arisen to provide Ethernet functions in network devices. Also, a ring system is said to be suitable for efficiently connecting sites in cities or the like where a large communication traffic occurs.

To enable efficient use of a band in a large-capacity ring network such as Gigabit Ethernet, a method may be used in which a physical transmission path in the ring network is used by being divided into a plurality of logic topologies. FIG. 10 shows an example of such a method in which if the transmission rate of a transmission path 10 in ring form is 2.4 Gb/s in accordance with Synchronous Optical Network (SONET)/SDH (Synchronous Digital Hierarchy). In this example, the transmission path 10 can be divided into sixteen logic topologies 101 to 116 on a Synchronous Transfer Mode (STM)-1 (155 Mb/s) basis (shown in the figure as logic topologies 101 to 10n in general form).

A method has been adopted in which such a plurality of divided logic topologies 101 to 116 on a 155 Mb/s basis are individually used or several (m number) of them on the 155 Mb/s basis are combined (bundled) to be used as a logical transmission path of m×155 Mb/s.

Under these circumstances, a system may be constructed in such a manner that Ethernet functions are added to the above-described ring system. When the above-described ordinary spanning tree function is performed in this system, one of a plurality of node devices 1a to 1e constituting the ring system is set as a root bridge (indicated by R) of a spanning tree, as shown in FIG. 11.

An ideal system for effectively using a band in a ring network performs transfer using a shortest route as shown in FIG. 12. In the system shown in FIG. 11, there is no traffic through the transmission path between the node devices 1d and 1c and traffics are concentrated in the vicinity of the node device 1a (root bridge R). That is, the example of the system shown in FIG. 11 has a problem of traffic being doubled in the vicinity of the root bridge R in comparison with the ideal system shown in FIG. 12.

SUMMARY OF THE INVENTION

An object of the present invention is to provide a node device for a ring system in which a plurality of spanning trees are constructed in such a manner as to solve the above-described problem, and a system and method for constructing multiple spanning trees by using the node device.

To attain the above-described object, according to one aspect of the present invention, there is provided a node device constituting a ring system, the node device having a plurality of bridge protocol processing sections each of which independently performs bridge protocol processing.

A transmission path constituting the ring system may be divided into a plurality of logic topologies, and the bridge protocol processing sections may be provided by being respectively related at least to the logic topologies.

The above-described node device may also have a bridge number determination section which determines a root bridge number in response to input of an externally-supplied node device number for the node device to set the node device as a root bridge in one spanning tree in the multiple spanning trees. Each of the bridge protocol processing sections may perform the bridge protocol processing on the basis of the root bridge number.

The node device may also have an initial information table in which a root bridge number is determined in advance to set the node device as a root bridge in one spanning tree in the multiple spanning trees, and a recognition section which recognizes in which one of the multiple spanning trees the node device is set as a root bridge by referring to the initial information table in response to input of an externally-supplied node device number for the node device. Each of the bridge protocol processing sections may perform the bridge protocol processing on the basis of the root bridge number.

According to another aspect of the present invention, there is provided a multiple spanning tree construction system for constructing multiple spanning trees in a ring system, spanning tree construction system having a plurality of node devices and a transmission path in ring form connecting the node devices to each other, the node devices and the transmission path constituting the ring system, the transmission path in ring form being divided into a plurality of logic topologies. Each of the node devices has a plurality of bridge protocol processing sections provided by being respectively related at least to the logic topologies, each of the bridge protocol processing sections independently performing bridge protocol processing. Multiple spanning trees are constructed in the ring system by execution of the bridge protocol processing with the plurality of bridge protocol processing sections.

Each of the above-described node devices may be provided with a bridge number determination section which determines a root bridge number in response to input of an externally-supplied node device number for the node device to set the node device as a root bridge in one spanning tree in the multiple spanning trees. Each of the bridge protocol processing sections may perform the bridge protocol processing on the basis of the root bridge number.

Also, each of the above-described node devices may be provided with an initial information table in which a root bridge number is determined in advance to set the node device as a root bridge in one spanning tree in the multiple spanning trees, and a recognition section which recognizes in which one of the multiple spanning trees the node device is set as a root bridge by referring to the initial information table in response to input of an externally-supplied node device number for the node device. Each of the bridge protocol processing sections may perform the bridge protocol processing on the basis of the root bridge number.

According to still another aspect of the present invention, there is provided a method of constructing multiple spanning trees in a ring system which is constituted by a plurality of node devices and a transmission path in ring form connecting the node devices to each other, and in which the transmission path in ring form is divided into multiple spanning trees, which are a plurality of logic topologies. The method includes, as steps performed in each of the node devices, a step of independently performing a plurality of bridge protocol processings in correspondence with the logic topologies, and a step of constructing multiple spanning trees in the ring system by executing the plurality of bridge protocol processings.

The above-described method may further include, as a step performed in each of the node devices, a step of determining a root bridge number in response to input of an externally-supplied node device number for the node device to set the node device as a root bridge in one spanning tree in the multiple spanning trees. The bridge protocol processing may be performed on the basis of the root bridge number.

The above-described method may further include providing each of the node devices with an initial information table in which a root bridge number is determined in advance to set the node device as a root bridge in one spanning tree in the multiple spanning trees, and comprising, as a step performed in each of the node devices, a step of recognizing in which one of the multiple spanning trees the node device is set as a root bridge by referring to the initial information table in response to input of an externally-supplied node device number for the node device. The bridge protocol processing may be performed on the basis of the root bridge number.

According to a further aspect of the present invention, there is provided a method of controlling each of a plurality of node devices connected to each other by a transmission path in ring form in a ring system, the transmission path in ring form being divided into a plurality of logic topologies, the method including a step of independently performing a plurality of bridge protocol processings in correspondence with the logic topologies, and a step of constructing multiple spanning trees in the transmission path in ring form by executing the plurality of bridge protocol processings.

According to still a further aspect of the present invention, there is provided a recording medium on which is stored a program for executing a method of controlling each of a plurality of node devices connected to each other by a transmission path in ring form in a ring system, the transmission path in ring form being divided into a plurality of logic topologies, the program including a step of independently performing a plurality of bridge protocol processings in correspondence with the logic topologies, and a step of constructing multiple spanning trees in the transmission path in ring form by executing the plurality of bridge protocol processings.

The functions of the present invention will be described. In the method of constructing multiple spanning trees in the ring system in accordance with the present invention, a plurality of spanning trees are formed in the ring network to effectively use the band in the ring network. To enable a plurality of bridge protocol processings to be performed in the transmission path connected to one node device, a plurality of bridge protocol processing sections are provided in the node device, thus making it possible to construct a plurality of spanning trees and to place a root bridge in each node device.

BRIEF DESCRIPTION OF THE DRAWINGS

FIG. 4 is a diagram showing a bridge numbering rule in the embodiment of the present invention;

FIG. 9 is a diagram showing an example of an initial information table in the node device shown in FIG. 8;

DETAILED DESCRIPTION OF THE PREFERRED EMBODIMENTS

Figure 1:
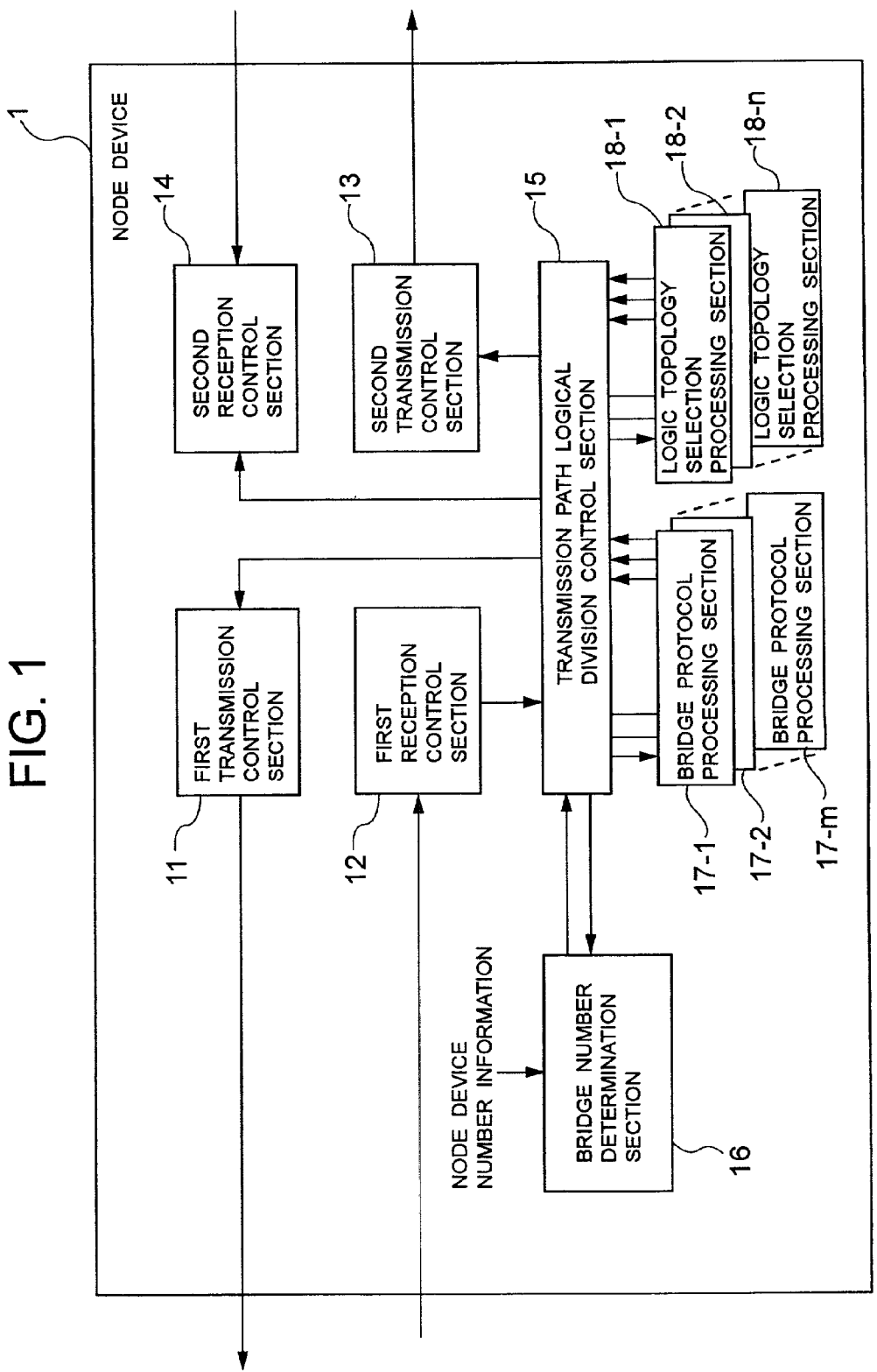
FIG. 1 is a block diagram of a node device which represents an embodiment of the present invention.
Figure 2:
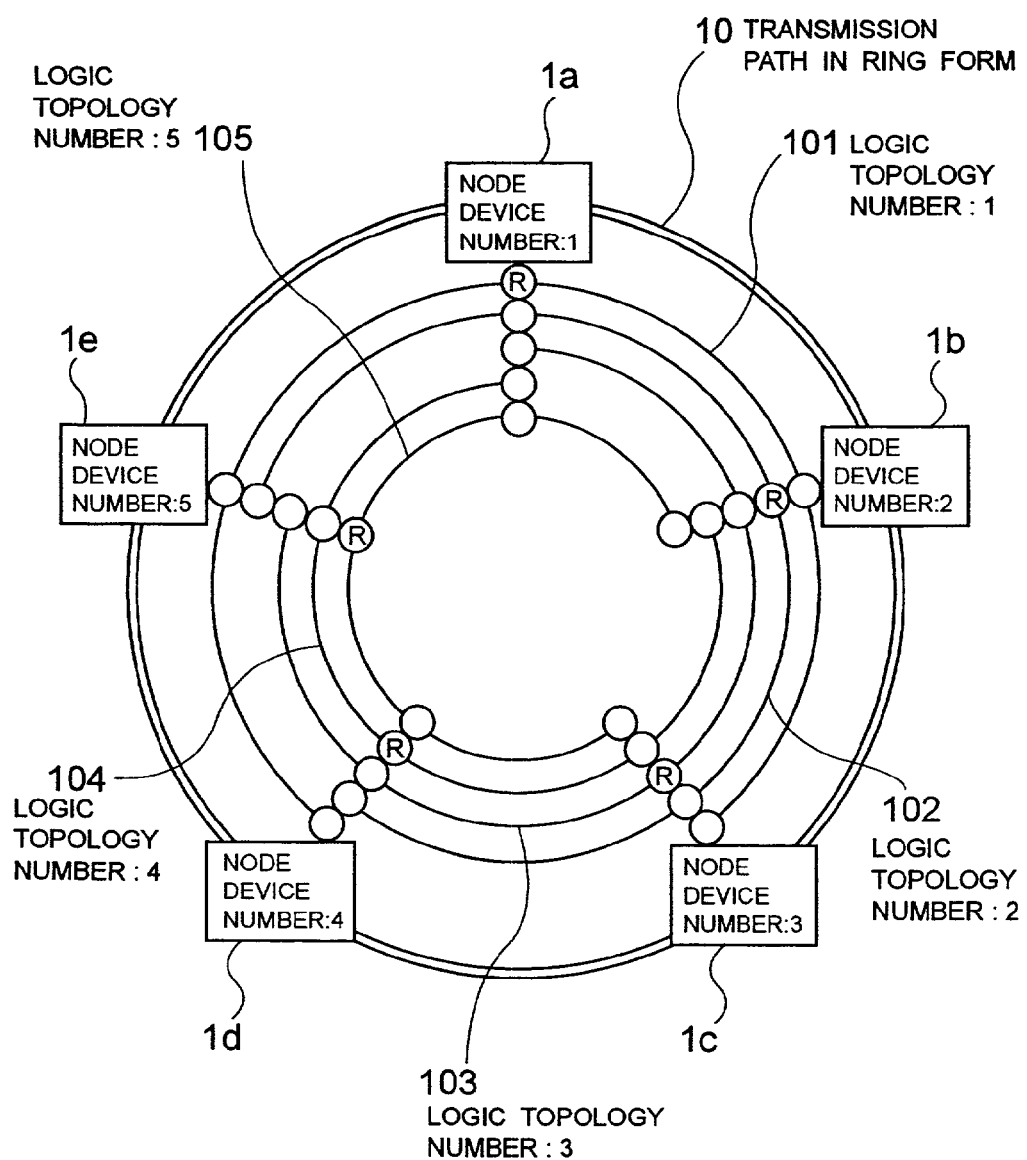
FIG. 2 is a diagram showing an example of a configuration of a ring network including the node device shown in FIG. 1.

Embodiments of the present invention will be described with reference to the accompanying drawings. FIG. 1 is a block diagram showing a configuration of an embodiment of a node device in accordance with the present invention, which is one of node devices 1a to 1e constituting a ring system shown in FIG. 2. In FIG. 2, a transmission path in ring form is denoted by 10 and logic topologies logically divided are denoted by 101 to 105.

Referring to FIG. 1, a node device 1 has a first transmission control section 11, a first reception control section 12, a second transmission control section 13, a second reception control section 14, a transmission path logical division control section 15, a bridge number determination section 16, bridge protocol processing sections 17-1 to 17-m (m: natural number), and logic topology selection processing sections 18-1 to 18-n (n: natural number). The node device 1 is one device in a ring network such as the one shown in FIG. 2.

The first transmission control section 11, the first reception control section 12, the second transmission control section 13 and the second reception control section 14 perform the functions of transmitting and receiving signals between each of the adjacent pairs of the node devices in the ring network. The first transmission control section 11 and the second transmission control section 13 respectively have output terminals connected to the transmission path and input terminals connected to the transmission path logical division control section 15. The first reception control section 12 and the second reception control section 14 respectively have input terminals connected to the transmission path and output terminals connected to the transmission path logical division control section 15. The transmission path logical division control section 15 performs control for logically dividing a transmission band in the ring network.

The bridge number determination section 16 is supplied with node device number information from the outside and with an output from the transmission path logical division control section 15, and has the function of determining on which one of a plurality of logically divided topologies existing in each node device a root bridge acts when a plurality of spanning trees are formed in the ring network, in other words, determining a root bridge with respect to each logical topology. The bridge number determination section 16 determines a root bridge number representing a root bridge.

Each of the bridge protocol processing sections 17-1 to 17-m has the function of forming an independent spanning tree of logically divided transmission paths in the ring network by performing independent control under a bridge protocol. The logic topology selection processing sections 18-1 to 18-n perform processing for ensuring independence and exclusiveness between logically divided topologies by performing signal processing with respect to each topology.

The operation of the present invention will now be described with reference to FIGS. 1 to 4. The first transmission control section 11, the first reception control section 12, the second transmission control section 13 and the second reception control section 14 perform operations for transmitting and receiving signals between each of the adjacent pairs of the nodes in the ring network shown in FIG. 2.

Each of the first transmission control section 11 and the second transmission control section 13 supplied with an output from the transmission path logical division control section 15 processes a signal which is to be output to the transmission path. The output terminals of the first transmission control section 11 and the second transmission control section 13 are connected to the transmission path, and the signals are output from the node device 1 through these output terminals. On the other hand, the first reception control section 12 and the second reception control section 14 which are connected to the adjacent node devices and through which signals are input from the transmission path perform signal receiving processing. The output terminals of the first and second signal reception control sections 12 and 14 are connected to the transmission path logical division control section 15.

The transmission path logical division control section 15 supplied with the output from the first reception control section 12, the output from the second reception control section 14, outputs from the bridge number determination section 16, outputs from the bridge protocol processing sections 17-1 to 17-m, and outputs from the logic topology selection processing sections 18-1 to 18-n, logically divides the transmission path to enable efficient use of the physical transmission path in the ring network to which the node device 1 is connected. This logical division of the transmission path is set in advance at the network system design stage. Logical topologies, e.g., those indicated by 101 to 105 in FIG. 2 are formed in accordance with this setting.

The transmission path logical division control section 15 also has the function of taking the outputs from the bridge protocol processing sections 17-1 to 17-m into logically divided bands to enable operations using them. The transmission path logical division control section 15 further has the function of inserting in the logically divided transmission paths signals which are input from the logic topology selection processing sections 18-1 to 18-n, and the function which is the reverse of the signal inserting function.

Outputs from the transmission path logical division control section 15 are respectively input to the first transmission control section 11, the second transmission control section 13, the bridge number determination section 16, the bridge protocol processing sections 17-1 to 17-m, and the logic topology selection processing sections 18-1 to 18-n. The bridge number determination section 16 is supplied with node device number information from the outside and with the output from the transmission path logical division control section 15, and has the function of determining on which one of the plurality of logically divided topologies existing in each node device a root bridge (indicated by R in FIG. 2) acts when a plurality of spanning trees are formed in the ring network.

Figure 3:
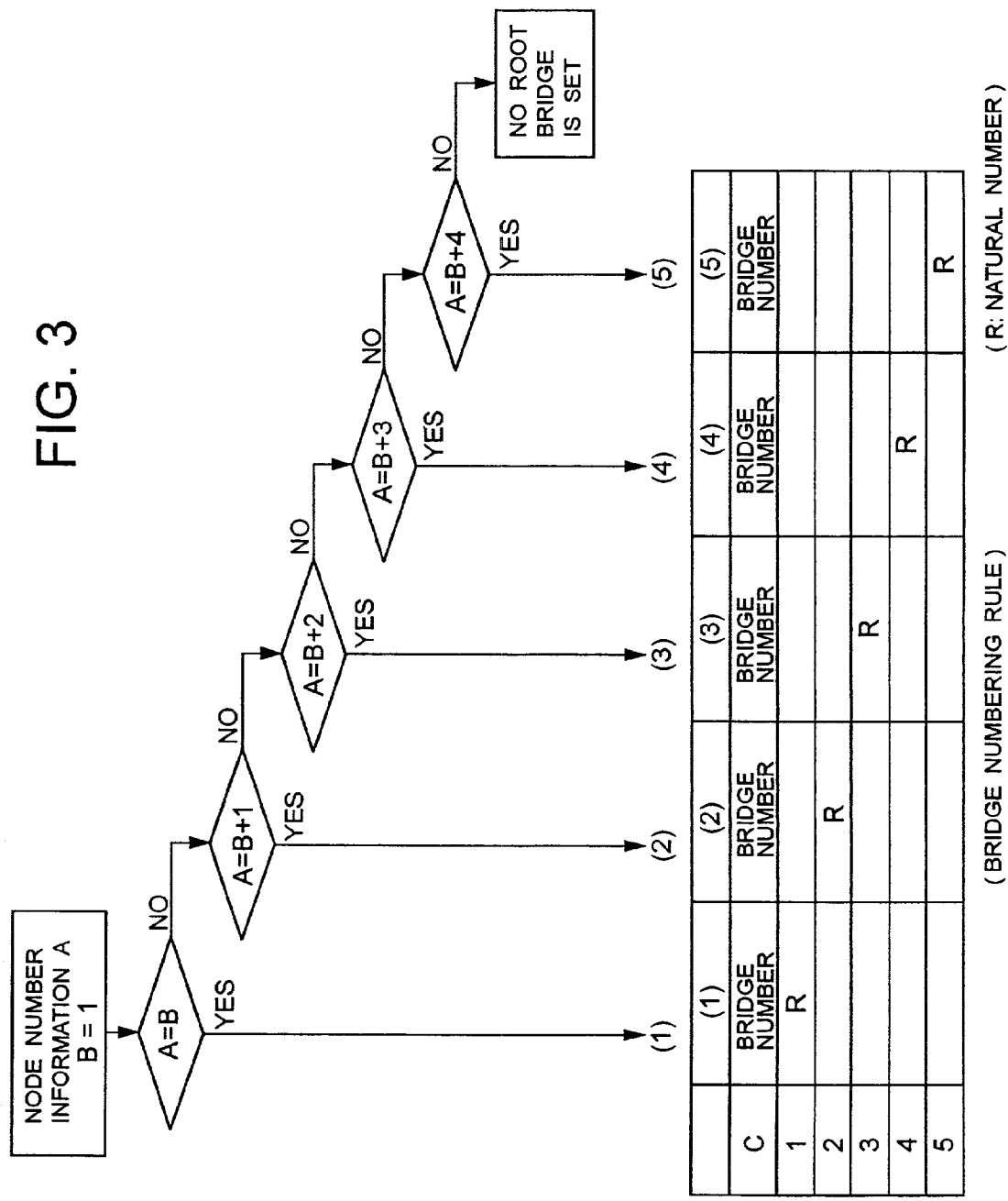
FIG. 3 is a flowchart showing an example of processing in a bridge number determination section 6 shown in FIG. 1.

An example of the operation of the bridge number determination section 16 will be described with reference to FIG. 3. FIG. 3 is a flowchart showing an example of processing in the bridge number determination section 16. In FIG. 3, a reference character A represents node device number information, a reference character B denotes a constant, a reference character C denotes the logic topology number, and a reference character R denotes the bridge number. For ease of description, it is assumed here that the ranges in which A and C can change respectively are equal to the range from 1 to m and the range from 1 to n, respectively indicating the number of the bridge protocol processing sections and the number of the logic topology selection processing sections in FIG. 1, and that m=n=5 since there are five node devices in the ring network in the example shown in FIG. 2.

In the example shown in FIG. 3, B=1 (B in this case is fixed at "1"). Accordingly, if node device number information A is "3", then the result of determination of a qualification "A=B+2" is "Y (YES)", the bridge number corresponding to the logic topology number "3" in the node device 1c having the node device number "3" is "R" (root bridge), and a root bridge related to the logic topology number "3" is the node device 1c having the node device number "3". The same processing is performed in the other node devices. Thus, under a bridge numbering rule shown in a lower section of FIG. 3, each node device is uniquely given the number R designating the root bridge in one of the logic topologies (C=1 to 5).

Figure 10:
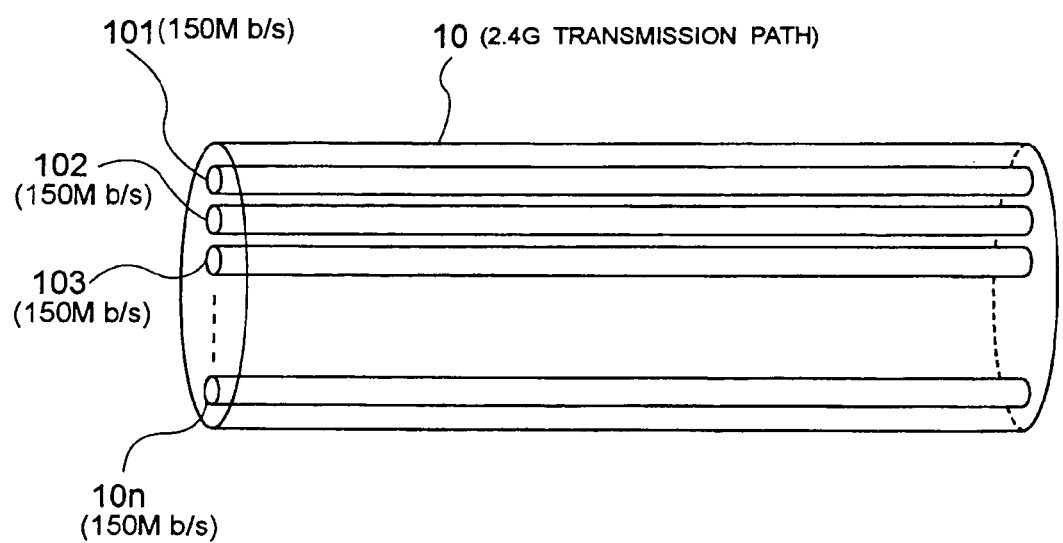
FIG. 10 is a diagram showing an example of logical division of a transmission path in ring form into a plurality of topologies.
Figure 11:
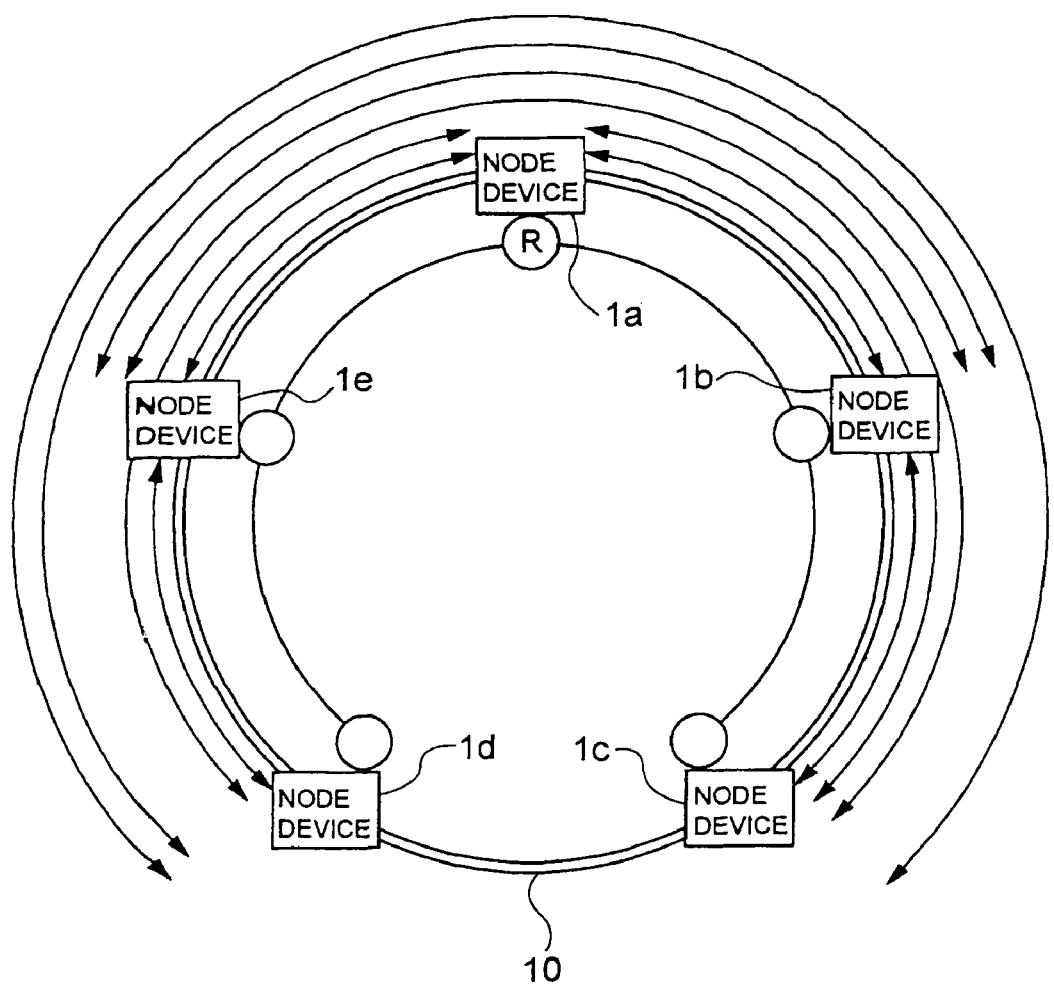
FIG. 11 is a diagram showing the configuration of an example of a conventional ring network.
Figure 12:
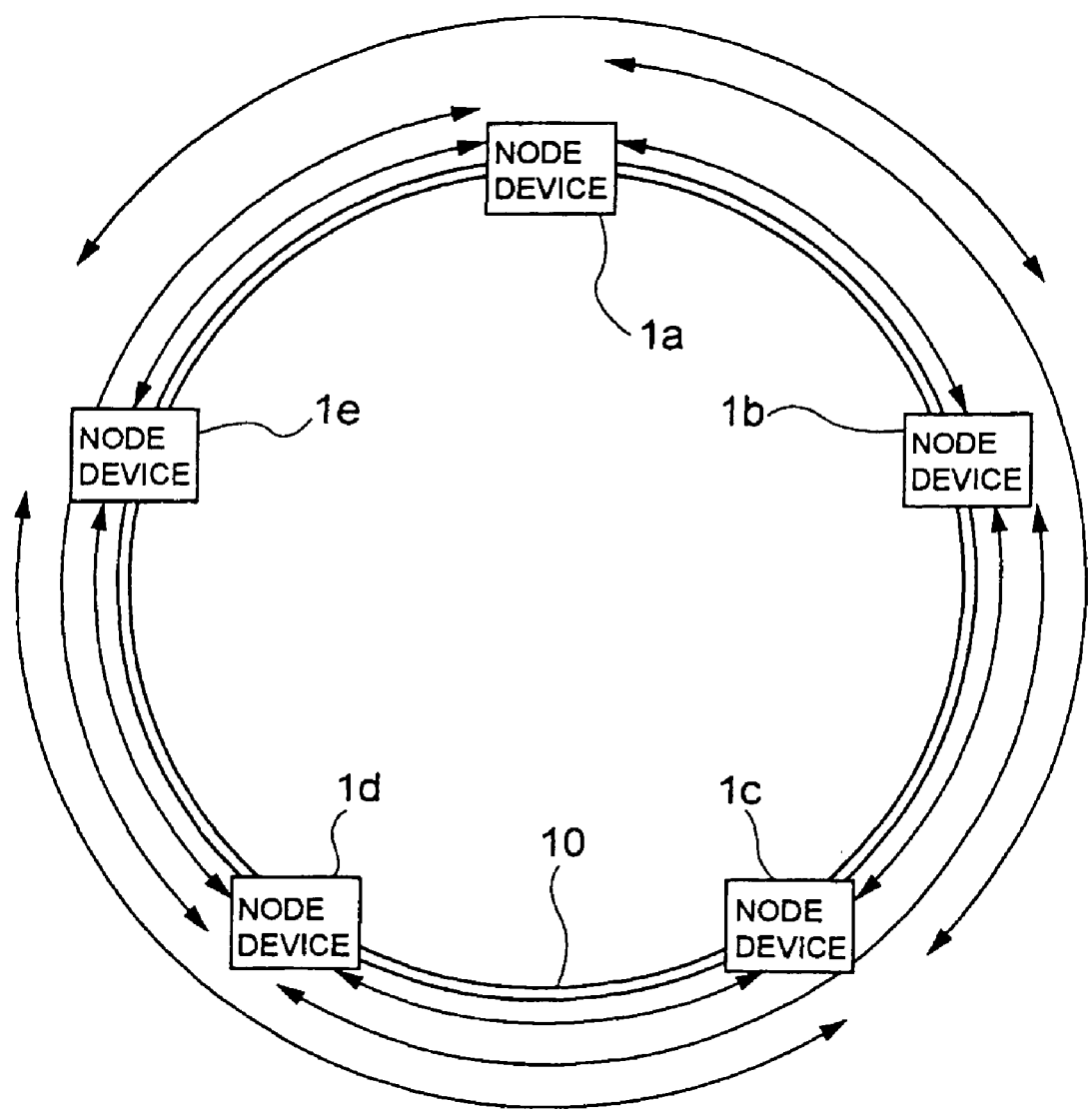
FIG. 12 is a diagram showing an ideal system for effective use of a ring network band.

Thereafter, each of the bridge protocol processing sections 17-1 to 17-m independently executes bridge protocol processing with respect to the corresponding logic topology. This bridge protocol processing is processing for construct a spanning tree under the well-known protocol specified in IEEE802.1D. By execution of processing in accordance with this bridge protocol, spanning trees such as those indicated by 101 to 105 in FIG. 2 are formed. Consequently, multiple spanning trees are formed as logically a plurality of topologies from one ring transmission path 10. (It is assumed that, as described above with reference to FIG. 10, the plurality of logic topologies are set in advance at the system design stage and the transmission path logical division control section 15 correspondingly recognizes the logic topologies 101 to 105.)

This bridge protocol processing is executed in correspondence with each of spanning trees to be constructed and is performed by exchanging the configuration-bridge protocol data unit (C-BPDU) specified in IEEE802.1D between the node devices. As a result, bridge numbers other than the root bridge number are successively given as in an example shown in FIG. 4.

For example, as shown in the section corresponding to the node device number "3", the bridge number corresponding to the logic topology number "4" is given as "R+1" and the bridge number corresponding to the logic topology number "5" is given as "R+2". The above-described bridge numbering is performed in the other node devices. Of the given bridge numbers in the section corresponding to the logic topology number "3", the bridge number corresponding to the node device number "3" is the smallest. Thus, the node device number "3" designates a root bridge with respect to the logic topology number "3".

The same processing is performed in each node device. In the example shown in FIG. 2, therefore, root bridges are set in one-to-one relationship with the node devices. Thus, (m=n) number of bridge protocol processings at the maximum can be performed on the logically divided transmission paths.

Each of the bridge protocol processing sections 17-1 to 17-m has the function of constructing a spanning tree, and each of the logic topology selection processing sections 18-1 to 18-n performs the operation for ensuring independence and exclusiveness between the logically divided topologies, as described above.

Figure 5:
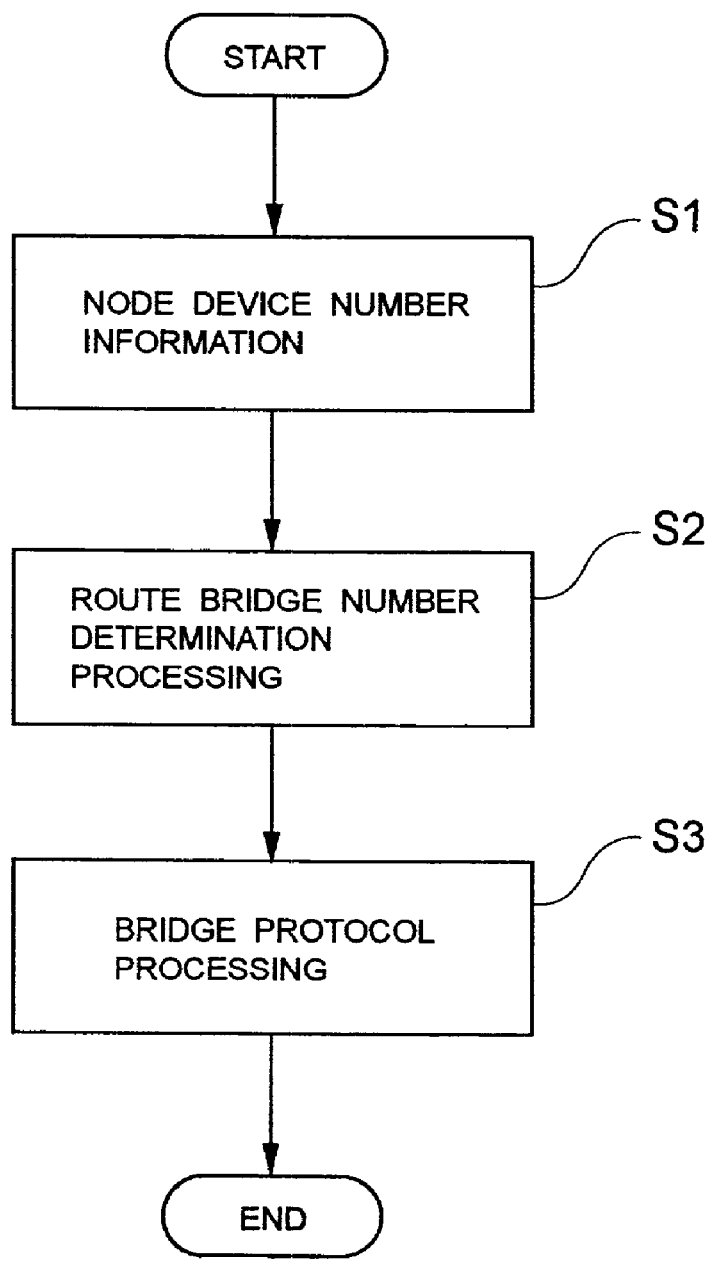
FIG. 5 is a flowchart outlining an operation of the embodiment of the present invention.

FIG. 5 is a flowchart outlining the operation with respect to the above-described kinds of processing. First, when node device number information is externally given to each node device (step S1), the bridge number determination section 16 determines the root bridge number R with respect to each logic topology in response to the given information (step S2). Then the bridge protocol processing sections 17-1 to 17-m independently perform bridge protocol processing in correspondence with the logic topologies on the basis of the root bridge number R (step S3), thereby giving the bridge numbers shown in FIG. 4 to the node devices with respect to each logic topology. Thus, multiple spanning trees are constructed.

Figure 6:
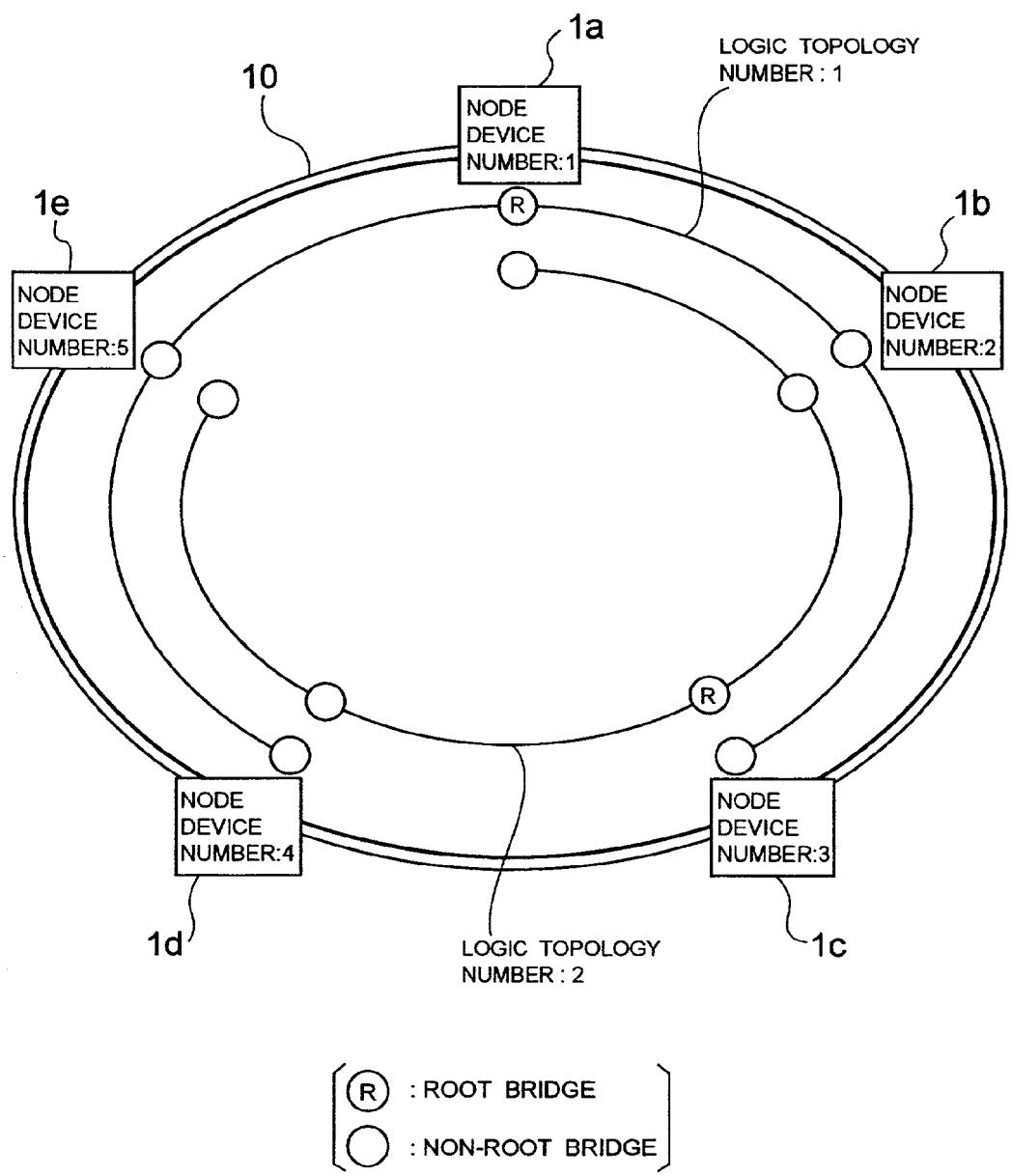
FIG. 6 is a diagram showing an example of a configuration of a ring network for explaining another embodiment of the present invention.

While the description has been made by assuming for convenience sake that the number of node devices=m=n, the number of node devices, the number of bridge protocol processings and the number of logic topologies are not always equal to each other in actual networks. For example, in a case where, as shown in FIG. 6, the number of node devices is 5; the number of bridge protocol processing sections is 2; and the number of logic topologies is 2, a bridge numbering rule such as shown in FIG. 7 is used in order to place root bridges in a dispersing manner.

Figure 7:
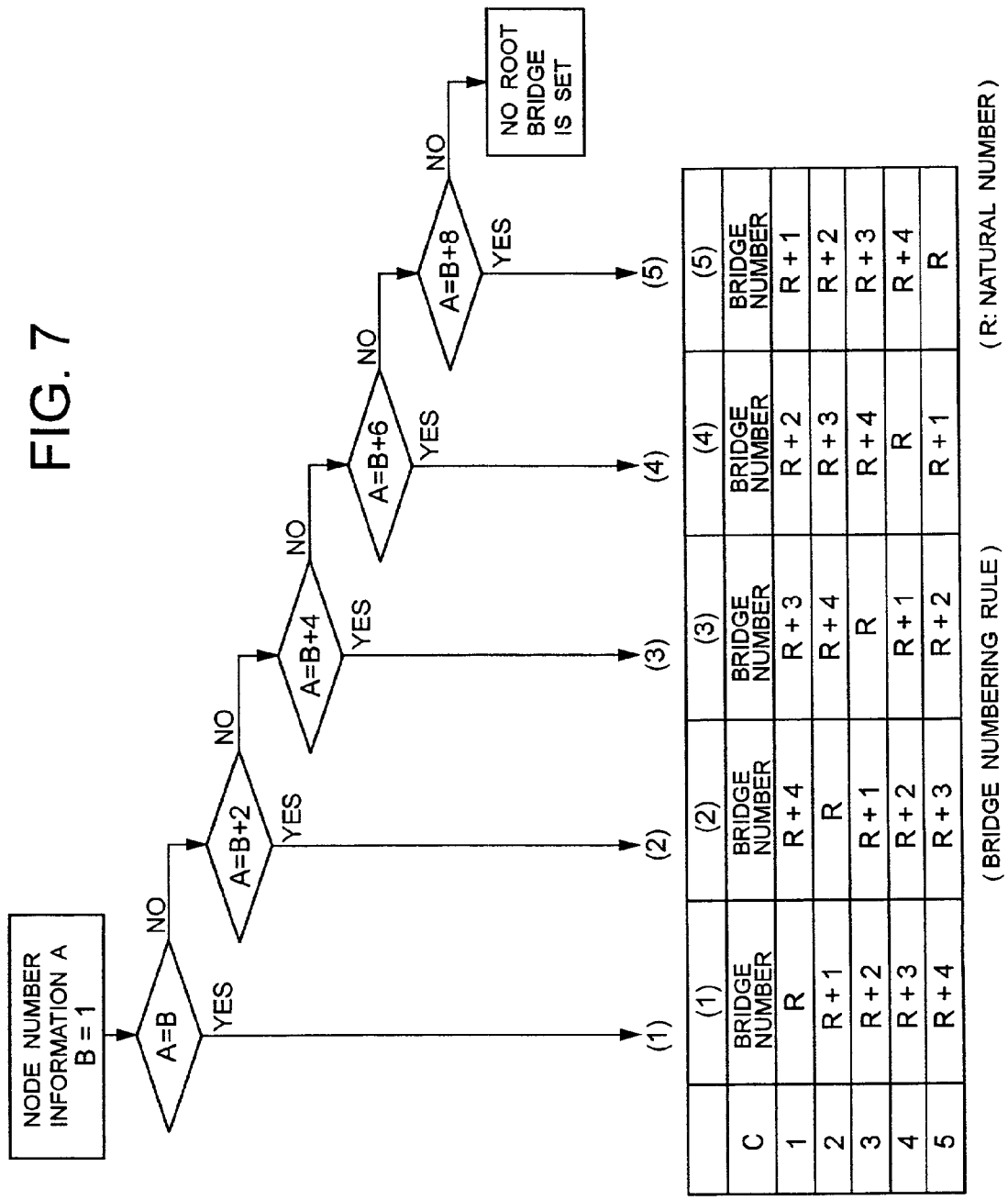
FIG. 7 is a diagram showing examples of a process and a rule for bridge numbering in the ring network shown in FIG. 6.

Referring to FIG. 7, a determination result "YES" is obtained as one of the results (1) with respect to the node number "1", and no determination result "YES" is obtained with respect to the node number "2". No root bridge is set with respect to this node number. A determination result "YES" is obtained as one of the results (2) with respect to the node number "3". Consequently, root bridge setting (R) related to logic topologies 1 and 2 can made with respect to the node numbers "1" and "3" to place root bridges at positions in the ring network selected in a skipping manner. The set numbers corresponding to "2" and "4" in qualifications A=B+2 and A=B+4 shown in FIG. 7 can be freely selected, thereby increasing the degree of freedom of placement of root bridges.

In the bridge numbering rule table in a lower section of FIG. 7, a rule for determination of the root bridge number R in the bridge number determination section and a rule for giving bridge numbers other than the root bridge number in the bridge protocol processing sections are shown together by way of example.

Figure 8:
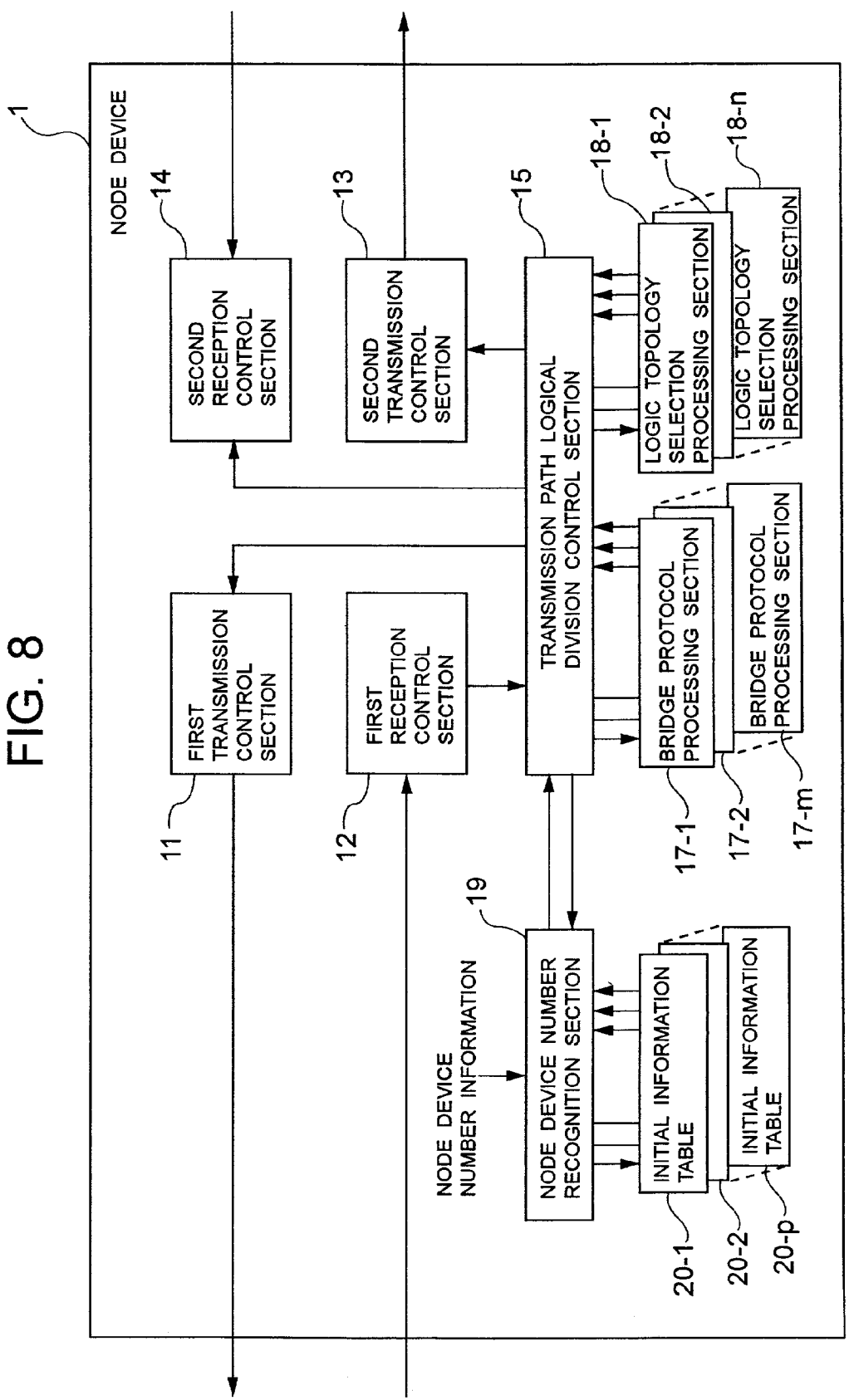
FIG. 8 is a block diagram of a node device which represents another embodiment of the present invention.

Another embodiment of the present invention will be described in detail with reference to FIG. 8. In FIG. 8, the sections corresponding to those shown in FIG. 1 are indicated by the same reference characters. The difference of the configuration of this embodiment from that shown in FIG. 1 resides in that a node device number recognition section 19 and initial information tables 20-1 to 20-p (p: natural number) are provided in place of the bridge number determination section 16 shown in FIG. 1.

The initial information tables 20-1 to 20-p are information tables in which the relationship between the logical band number and the bridge number is fixedly set with respect to the node device number. FIG. 9 shows an example of them. In FIG. 9, reference character A represents the node device number and reference character C represents the logic topology number. The tables in the column direction in FIG. 9 show the contents of the initial information tables 20-1 to 20-6.

The node device number recognition section 19 recognizes the node number of the device to which it belongs on the basis of node device number information externally supplied. The node device number recognition section 19 reads the contents of the table corresponding to the recognized node number in the initial information tables 20-1 to 20-p, and transmits the read contents to the transmission path logical division control section 16.

This embodiment has the advantage of obtaining substantially the same effect as that of the first embodiment by performing a simple process of searching the initial information tables instead of complicated computational processing for bridge numbering. However, the second embodiment is regarded as lower in flexibility than the embodiment shown in FIG. 1 since bridge numbering is performed in a fixed manner.

The logic topology selection processing sections 18-1 to 18-n shown in FIGS. 1 and 18, perform data frame forwarding processing after the above-described multiple spanning tree construction processing. A user terminal (not shown) for performing data frame transmission/reception is connected to each logic topology selection processing section. Each logic topology selection processing section selects one of the plurality of divided logic topologies to which data frames from the corresponding user terminal will be sent.

That is, in a case where a plurality of groups of user traffic exist in one ring network, the logic topology selection processing sections operate so as to prevent mixing of them and information leakage between users. As means for achieving this effect, a Multi Protocol Label Switching (MPLS) method, virtual LAN (VLAN), etc., are known. In a case where three groups of user traffic A, B, and C exist mixedly in one ring network, signal processing is performed on the basis of label information (or address information) fixedly assigned to users in either MPLS or VLAN to ensure independence between the users.

For example, if label assignment:

for user A: 111. *. *. *** for user B: 222. *. *. *** for user C: 333. *. *. *** is given, each of the plurality of logic topology selection processing sections recognizes the user label assignment content that it can process by itself. That is, the logic topology selection processing sections perform signal processing in a load-sharing manner such that the logic topology selection processing section 18-1 performs processing for user A, the logic topology selection processing section 18-2 performs processing for user B, and the logic topology selection processing section 18-3 performs signal processing for user C.

It is apparent that the processing procedure for construction of multiple spanning trees by means of the node devices in each of the above-described embodiments can easily be realized by being stored in advance as a program on a read-only storage medium or the like and by being read out to a computer such as a central processing unit (CPU) to be executed.

The present invention has the effect of preventing concentration of traffic at one node device in a ring network and enabling the transmission band to be evenly used. This effect is achieved in such a manner that a plurality of bridge protocol processings are performed in one node device to enable setting of one root bridge in one node device by enabling to construct a plurarity of spanning trees.

What is claimed is:

1. A node device being a component of a ring system, said node device comprising a plurality of bridge protocol processing sections each of which form an independent spanning tree of logically divided transmission paths under bridge protocol processing, and a plurality of logic topology selection processing sections each of which process signals into a plurality of logically divided topologies.

2. The node device according to claim 1, wherein a transmission path in ring form comprising the ring system is divided into the plurality of logically divided topologies, and said bridge protocol processing sections are provided by being respectively related at least to the logic topologies to construct multiple spanning trees corresponding to the logic topologies.

3. The node device according to claim 2, further comprising a bridge number determination section which determines a root bridge number in response to input of an externally-supplied node device number for the node device to set the node device as a root bridge in one spanning tree in the multiple spanning trees,
wherein each of said bridge protocol processing sections performs the bridge protocol processing on the basis of the root bridge number.

4. The node device according to claim 2, further comprising an initial information table in which a root bridge number is determined in advance to set the node device as a root bridge in one spanning tree in the multiple spanning trees, and a recognition section which recognizes in which one of the multiple spanning trees the node device is set as a root bridge by referring to said initial information table in response to input of an externally-supplied node device number for the node device,
wherein each of said bridge protocol processing sections performs the bridge protocol processing on the basis of the root bridge number.

5. The node device according to claim 1, wherein said plurality of bridge protocol processing sections form said independent spanning trees of logically divided transmission paths by performing independent control under a bridge protocol.

6. The node device according to claim 1, wherein said plurality of logic topology selection processing sections provide independence and exclusivity between said plurality of logically divided topologies by performing signal processing with respect to each topology.

7. The node device according to claim 1, wherein the logical division of the divided transmission paths are set in advance at a network system design stage.

8. The node device according to claim 1, wherein the plurality of logical divided topologies are set in advance at a network system design stage.

9. The node device according to claim 1, further comprising:
a transmission path logical division control section that receives logically divided transmission paths output from the plurality of bridge protocol processing sections.

10. The node device according to claim 9, wherein the transmission path logical division control section inserts signals into the logically divided transmission paths that are input from the plurality of logic topology of selection processing sections.

11. A multiple spanning tree construction system for constructing multiple spanning trees in a ring system, comprising a plurality of node devices and a transmission path in ring form connecting said node devices to each other, said transmission path in ring form being divided into a plurality of logic topologies,
wherein each of said node devices comprises a plurality of bridge protocol processing sections provided by being respectively related at least to the logic topologies, each of said bridge protocol processing sections independently performing bridge protocol processing, and
multiple spanning trees are constructed in said ring system by execution of the bridge protocol processing with said plurality of bridge protocol processing sections.

12. The multiple spanning tree construction system according to claim 11, wherein each of said node devices is provided with a bridge number determination section which determines a root bridge number in response to input of an externally-supplied node device number for the node device to set the node device as a root bridge in one spanning tree in the multiple spanning trees, and each of said bridge protocol processing sections performs the bridge protocol processing on the basis of the root bridge number.

13. The multiple spanning tree construction system according to claim 11, wherein each of said node devices is provided with an initial information table in which a root bridge number is determined in advance to set the node device as a root bridge in one spanning tree in the multiple spanning trees, and a recognition section which recognizes in which one of the multiple spanning trees the node device is set as a root bridge by referring to said initial information table in response to input of an externally-supplied node device number for the node device, and each of said bridge protocol processing sections performs the bridge protocol processing on the basis of the root bridge number.

14. A method of constructing multiple spanning trees in a ring system which is constituted by a plurality of node devices and a transmission path in ring form connecting the node devices to each other, and in which the transmission path in ring form is divided into a plurality of logic topologies, wherein each of said node devices comprises:
independently performing a plurality of bridge protocol processings in correspondence with the logic topologies; and
constructing multiple spanning trees in the ring system by executing the plurality of bridge protocol processings.

15. The method according to claim 14, further comprising; in each of the node devices, determining a root bridge number in response to input of an externally-supplied node device number for the node device to set the node device as a root bridge in one spanning tree in the multiple spanning trees,
  wherein the bridge protocol processing is performed on the basis of the root bridge number.

16. The method according to claim 14, further comprising:
  providing each of the node devices with an initial information table in which a root bridge number is determined in advance to set the node device as a root bridge in one spanning tree in the multiple spanning trees; and
  in each of the node devices, recognizing in which one of the multiple spanning trees the node device is set as a root bridge by referring to the initial information table in response to input of an externally-supplied node device number for the node device,
  wherein the bridge protocol processing is performed on the basis of the root bridge number.

17. A method of controlling each of a plurality of node devices connected to each other by a transmission path in ring form in a ring system, the transmission path in ring form being divided into a plurality of logic topologies, comprising:
  independently performing a plurality of bridge protocol processings in correspondence with the logic topologies; and
  constructing multiple spanning trees in the transmission path in ring form by executing the plurality of bridge protocol processings.

18. The method according to claim 17, further comprising:
  determining a root bridge number for each of the node devices in response to input of an externally-supplied node device number to set the node device as a root bridge in one spanning tree in the multiple spanning trees,
  wherein the bridge protocol processing is performed on the basis of the root bridge number.

19. The method according to claim 17, further comprising:
  providing an initial information table in which a root bridge number is determined in advance to set each of the node devices as a root bridge in one spanning tree in the multiple spanning trees; and
  recognizing in which one of the multiple spanning trees each node device is set as a root bridge by referring to the initial information table in response to input of an externally-supplied node device number for the node device,
  wherein the bridge protocol processing is performed on the basis of the root bridge number.

20. A computer readable recording medium on which is stored a computer program for executing a method of controlling each of a plurality of node devices connected to each other by a transmission path in ring form in a ring system, the transmission path in ring form being divided into a plurality of logic topologies, wherein said program comprises:
  independently performing a plurality of bridge protocol processings in correspondence with the logic topologies; and
  constructing multiple spanning trees in the transmission path in ring form by executing the plurality of bridge protocol processings.

* * * * *